United States Patent
Farrow

(10) Patent No.: US 6,701,829 B2
(45) Date of Patent: Mar. 9, 2004

(54) RAPID ANTI-FLARE-UP SMOKER FOR GRILLS

(76) Inventor: Samuel Farrow, 3151 Highway K, Hartford, WI (US) 53027

( * ) Notice: Subject to any disclaimer, the term of this patent is extended or adjusted under 35 U.S.C. 154(b) by 59 days.

(21) Appl. No.: 10/151,756

(22) Filed: May 20, 2002

(65) Prior Publication Data

US 2003/0213378 A1 Nov. 20, 2003

(51) Int. Cl.⁷ ................................................ A23L 1/01
(52) U.S. Cl. ........................ 99/482; 99/450; 126/595; 426/314
(58) Field of Search .......................... 99/482, 450, 467; 126/59.5; 426/314, 315; 53/452, 396; 29/428, 33

(56) References Cited

U.S. PATENT DOCUMENTS 2,796,019 A * 6/1957 Ferguson .................. 99/346
2,967,023 A * 1/1961 Huckabee .................. 239/60
5,301,606 A * 4/1994 Ferguson .................. 99/482

* cited by examiner

Primary Examiner—Reginald L. Alexander
(74) Attorney, Agent, or Firm—Donald W. Meeker

(57) ABSTRACT

Two steel plates with perforations in both sheets have narrow bent edges which overlap when the two plates are placed together to for a rapid smoker with approximately ¾ inch between the plates. A layer of wood chips is placed in the rapid smoker and the smoker placed directly on the heating source of any type of grill. The wood catches fire quickly through the bottom perforations and sends smoke through the top perforations. The perforation are configured in the top and bottom steel plates in such a way as to accomplish rapid ignition of wood producing smoke and control of the burning/smoking process. This process produces two cooking zones and adds additional favor to the cooked food.

20 Claims, 8 Drawing Sheets

RAPID ANTI-FLARE-UP SMOKER FOR GRILLS

BACKGROUND OF THE INVENTION

1. Field of the Invention

The present invention relates to cooking grills and in particular to an insertable rapid-starting smoker for all types of grills to smoke the food wherein the smoker also prevents flare ups of the fire and creates two cooking zones.

2. Description of the Prior Art

Smoking food using wood chips imparts a particularly appealing taste to meat and other food that is desired by many people. Liquids containing smoke flavored chemicals are available, but do not always simulate true smoked flavor and likely contain chemicals that are unhealthy.

Barbecue grills present an excellent opportunity for smoking food since they are generally used in an outdoor environment where the smoke is not a problem. Properly vented indoor grills and broilers also may utilize smoking to supplement the cooking process and impart a smoked flavor to the food.

Slow smoking methods take a long time to prepare the food and expose the environment to smoke for a much longer time.

U.S. Pat. No. 4,140,049, issued Feb. 20, 1979 to Stewart, shows a method and apparatus for converting an enclosable food cooker having a food supporting surface into a food smoker which can be advantageously used to smoke food at a very slow rate without significant dehydration or loss of natural juices.

U.S. Pat. No. 6,029,567, issued Feb. 29, 2000 to Tirkkonen, claims a manufactured article for releasing smoke in conjunction with preparation of smoked food, the article comprising an outer shell (1) having at least one hole (2) made thereto, and a material (3) with heat-reacting and smoke-generating properties (3) placed inside the outer shell. According to the invention the article incorporates a heat-generating material (4) placed in the immediate vicinity of the smoke-releasing material (3) for heating the smoke-releasing material.

U.S. Pat. No. 5,653,162, issued Aug. 5, 1997 to Lunde, describes a smoker grill having five major parts: 1) a cover, 2) a wire rack, 3) a base unit with four side walls and a divider, 4) a fire pot, and 5) a stand. Air inlet holes are located along the base of the sidewalls. A stainless steel divider is located above the air holes in the base unit. The divider separates the enclosure into an upper chamber where the food is smoked or grilled, and a lower chamber. The divider is sloped downward to a hole in the center that allows grease from the food to drip into the fire pot in the lower the chamber. The fuel in the fire pot is denatured alcohol. When smoking a food product, a wood product is placed on the divider and food is placed on the wire rack above the wood product. When using the device as a grill, a wood product is not used. A cover is provided over the unit to enclose the upper chamber. The fire from the fire pot in the lower chamber heats the stainless steel divider which smokes the wood product or grill the food product in the upper chamber. The smoke in the upper chamber is forced down four rectangular holes in the corners of the divider. The smoke in the lower chamber may be ignited from the burning alcohol to produce a secondary burning which gives an even heat over the whole unit.

U.S. Pat. No. 6,102,028, issued Aug. 15, 2000 to Schlosser, discloses a smoker attachment for heating and burning smoker particles in a barbecue grill. The smoker attachment includes a housing having a side wall, end wall, and bottom wall defining a cavity therein. The bottom wall of the housing has a plurality of openings and the side walls have a plurality of corresponding cutouts adjacent the bottom wall such that the cutouts in the side walls cooperate with the openings in the bottom wall. The openings provide access to the cavity of the housing such that a conductive member within the barbecue grill is able to contact the housing adjacent the opening to position the housing within the bottom chamber of the barbecue grill. The conductive member further passes through the opening of the housing into the cavity of the housing to define a portion of the perimeter of the cavity for directly contacting and heating the smoker particles within the housing.

U.S. Pat. No. 5,718,165, issued Feb. 17, 1998 to Winstead, indicates a grill intended for use in outdoor cooking. A burner assembly and a grid are enclosed in a housing that is arranged for even distribution of heat through the grid, and the grill is selectively usable to barbecue meat with or without wood flavoring or to steam meat and other food.

U.S. Pat. No. 4,770,157, issued Sep. 13, 1988 to Shepherd, puts forth a barbecue having, for example, a heat source in the form of a gas burner, is provided with a device which permits smoke flavoring of food cooked on the barbecue. Wood chips are contained in a drawer which is received by a complementary sleeve located between the heat source and a cooking grill of the barbecue. During cooking the wood chips are heated by the heat source and the air flow through the drawer is restricted so that the wood chips give off smoke without igniting. The smoke flows about and flavors the food being cooked on the barbecue. Access to the sleeve and the wood chip drawer may be gained through a side wall of the barbecue body and thus the supply of wood chips may be replenished without interfering with the cooking operation. Means is provided to control the volume of smoke produced by the device.

U.S. Pat. No. 4,721,037, issued Jan. 26, 1988 to Blosnich, concerns An apparatus for cooking foods which is a combination of an outdoor grill and an optional smoker attachment. The grill itself is of a type having a container with an open top, a closed bottom, front and rear sidewalls for holding heat-retaining lava rock. A hinged lid which is removable is attached to the grill for retaining heat within the container. A removable grate is selectively disposed inside of the container above the lava rock when the device is to be used as a grill for holding foods directly up above the lava rock and such grate is removable when the device is to be used for smoking foods. When the apparatus is to be used as a smoker, a metal cabinet having a rear wall, a pair of sidewalls connected to the rear wall, a removable front wall and a top wall is placed upon the container and has an open bottom so that the heat from the lava rock will be trapped within such metal cabinet. A tray is disposed just above the lava rock for holding wood chips which will generate smoke for flavoring the food being smoked. Slots on the rear wall of the metal cabinet and hooks on the sidewall are provided for holding the metal cabinet onto the grill in a proper position. A plurality of grates are positioned in an upper part of the metal cabinet for holding foods during the smoking process. An optional small door is provided in the front wall of the cabinet for inserting additional wood chips as might be necessary, without losing the majority of the smoke within the cabinet.

U.S. Pat. No. 3,786,741, issued Jan. 22, 1974 to Plumley, illustrates a smoking and cooking apparatus for use with outdoor grills employing a closed container with metal top and bottom and a perforated metal plate.

U.S. Pat. No. 4,697,506, issued Oct. 6, 1987 to Ducate, is for a substantially U-shaped or V-shaped tray for flavoring food by burning woodchips. The tray includes an elongated base and opposing sidewalls which may diverge outwardly from the base. Each of the sidewalls contain a plurality of apertures at spaced intervals along the length of the sidewall. The number, size and location of the apertures and the angle of any sidewall divergence are such that when the tray is positioned above and in close proximity to a heat source, the apertures permit sufficient direct heating of the woodchips to cause burning thereof by smoldering and the solid portions of the base and sidewalls shield the woodchips sufficiently to prevent flaming thereof.

U.S. Pat. No. Des. 283,588, issued Apr. 29, 1986 to Stuckey, shows a design for a meat smoking device having a holder for wood chips and a perforated cover.

U.S. Pat. No. 4,779,525, issued Oct. 25, 1988 to Gaines, provides a smoke producing device for use in a barbecue or the like comprising a smoke producing material, such as wood chips, enclosed in a noncombustible perforated container. The perforations are kept covered by a perforation cover until use so as to prevent leakage of the smoke producing materials from the container and to prevent the loss of moisture and volatile aromatic oils from the smoke producing material. This cover is preferably constructed of a combustible material so that when heated in a barbecue, it will ignite and burn off to expose the perforations, through which the smoke can then escape to flavor the food.

U.S. Pat. No. 5,048,406, issued Sep. 17, 1991 to Cofer, indicates a disposable/refillable smoke cartridge for gas barbecue grills in a single-unit, ready-to-use device for flavoring food by smoking on a barbecue grill using gas or other fuels. This invention is a small, convenient cartridge containing small pieces of one of the aromatic woods, such as Hickory or Mesquite, etc., or any combination thereof. The package can contain draft vent perforations to allow enough air to flow in to promote charring without allowing ignition, and smoke to flow directly out. In use, the package is placed directly on the gas-heated lava rocks, burning charcoal, or other fuel. The wood chips within the package quickly begin to char and emit smoke, thus flavoring the food placed within the gas grill enclosure. When the process is complete, the cooled package can be easily disposed of along with the other household refuse, or it can be saved for recycling. Multiple cartridges can be made available in multi-cartridge carriers and more than one cartridge can be used simultaneously or sequentially. The cartridges can be refilled, if desired, to a limited degree.

U.S. Pat. No. 6,019,035, issued Feb. 1, 2000 to Jonas, claims a food smoker for providing a smoky flavor to food. The food smoker includes an elongate cylinder having opposed open ends and an interior adapted for receiving wood chips. The cylinder has a plurality of rows of generally equally spaced apertures extending through it. The apertures are positioned in an upper ⅓ portion of the cylinder. A pair of end caps are detachably coupled to the ends of the cylinder.

While there have been many patents issued for devices used in smoking food, especially for barbecue grills, none of them use a double perforated container with a single layer of wood chips placed directly on the fire or heat source. This invention smokes the food at a faster rate during a specified cooking cycle and process, while serving also to prevent flare-ups by covering a portion of the fire. This is a highly adaptive device that can be used across all types of grills and broilers.

SUMMARY OF THE INVENTION

An object of the present invention is to provide a food smoker with a layer of wood chips sized from 0.5 through 1.25 inches and bottom perforations to ignite the wood chips very quickly so that the present invention produces smoke very quickly to provide a fast method of smoking food.

Another object of the present invention is to provide a food smoker that is easily adaptable to any grill or broiler. (Charcoal, Gas or electric-outdoor grill or indoor grill or boiler)

One more object of the present invention is to provide a food smoker with top and bottom perforated plates having the perforations offset between the top and the bottom for creating a good draft damper control and maximizing the smoke produced with in established time periods. The perforations could be shaped as round holes, squares or any other shape that can be cut or punched out in a die.

An additional object of the present invention is to provide a simple food smoker that is durable and easily manufactured by stamping or laser cutting two sheets of metal and bending the edges of the metal and closing one plate on the other for a fast starting food smoker that may be used over and over again by replenishing the wood chips. In fact the present invention has been configured for manufacturing such that it can be made completely using a multi station progressive stamping and forming die.

A further object of the present invention is to provide protruding handles on each side that may be easily accessed with a tool for installing and removing the smoker. These handles also aid in radiant heat mass and area coverage for prevention of grill flare or flame ups as well as acts as the support mechanism for some medium and small size grills.

A contributory object of the present invention is to make a hinged version of the invention adapted for use in commercial and domestic broilers and ovens.

An added object of the present invention is to provide larger holes in the bottom plate for rapid ignition of the wood chips.

An ensuing object of the present invention is to provide smaller holes or fewer holes in the top plate with offset holes to dampen air flow-through to maximize the smoke and control the burning process. An alternate design would be to have the same size holes in the bottom and the top and reduce the number of holes in the top compared to the bottom in order to increase smoking by slowing down the flow through of air and the burning and ignition process of the smoking.

In brief two mating high temperature stainless steel plates are cut with flanges that bend to create overlapping low side walls and handles protruding from the sides of the bottom plate. Larger perforations in the bottom plate allow rapid smoke generation with the smoker placed on a fire or heat source. Smaller holes in the top plate offset from the bottom holes permits the smoke to flow, controlling the flow of smoke out of the smoker into the cooking area. The bottom of the smoker preferred embodiment of the invention is to have indented formed feet or a ribbed structure to improve the performance to the smoker.

There are more holes in the bottom than the top to allow for controlled burning. The holes in the bottom allow the heat and/or flame to start the smoking process, faster. Off-setting the holes from the bottom to the top plate of the smoker, with a larger total perforated area in the bottom plate than the top plates controls the smoke flow out of the smoker during the process producing more smoke and producing it faster than other methods.

The double perforated smoker enables a fast smoking method and apparatus that controls the burning of the wood dry or wet between the two stainless steel plates. A single layer of wood chips between the closely spaced plates makes for fast efficient smoking. The steel plates are interlocking with the handles for easy of loading as well as increased area for radiated heat and area coverage relative to the grill surface. The smoker covers approximately ½ of the heat source or grilling surface area. The smoker will not allow flame up as the juice(s) drip on the top plate of the smoker and this adds to the flavor process.

Using the smoker over a portion of the fire allows for a cooking method that includes placing the food over the grill area that is not covered by the smoker and then over the area of the grill that is covered by the smoker. This process allows the food to be seared on a hot side and cooked more slowly on the cooler side over the smoker. This process makes the meat more flavorful and also more tender. The side of the grill with the smoker is approximately 100–150 degrees F. different during the cooking and smoking cycle.

The smoker produces a heat curve within itself from cooler to hotter then cooler. The smoker also evens out the radiant heat-cooking concept over the grill area. This allows for more even cooking of the food over the smoker side. The smoker puts out real smoke taste in all woods: producing a very sweet apple taste using apple wood, and a barbecue flavor using hickory or mesquite woods for example.

Approximately 2–4 cups of 0.5–1.25 inch sized wood chips can be loaded into the smoker, as a single layer. The top of the smoker is configured in such a manner as to allow for irregular chip sizing and will expand to incorporate chip over 1.25 inches. The smoking time is 30–60 min for wet chips (soaked in water for a minimum of 10 minutes) and 15–40 minutes for dry chips. This is dependent on the density and type of chips that one uses. Reducing the amount of wood chips produces less smoke flavor. Smoking time would then be cut proportionally.

The method of the present invention comprises a preparatory step of burning off and cleaning the grill and grate to approximately 300 degrees to kill all bacteria. The first step is using the removing and installing tool to remove the grill and then install (place with the tool) the present invention so that the smoker is placed onto or into the heat source.

Then the next step is re-installing the grate and within a few minutes (with direct contact to flame) the invention will start smoking. The next step is placing the food on the grill grate for cooking and smoking. If the smoker is placed on a radiated heat source (defuser, heat deflector or exchanger) dependent on the type of model or type of grill, then it will take approximately 5–10 minutes to start the smoking process, and the same cooking and smoking process applies.

In the event that there is a need for more cooking or grilling time with the smoker. The smoker can be re-filled. The grate can be removed by inserting all three fingers of the tool between the openings in the grate and lifting the grate off of the grill. A large number of grills have two grates and removal of only one is necessary. The top cover of the smoker can then be removed by using the removing tool.

The removing and installing tool is a four in one tool. It will remove the grill grate, install the smoker using the handles with two prongs through a space between the handle and the side plate and a third prong through a hole in the handle, remove the top cover of the smoker to fill up the smoker with wood chips, and turn your steaks when used as a fork.

A modified embodiment of the smoker having a bottom with a hinge at one end and handle at the other may slide into an outdoor grill or indoor commercial grill that has been modified with a 2 inch slot (approximately) that has a hinged flap in the front wall of the grill. This will also work for commercial application such as in restaurants gas fired char-broiler or gas or electric broiler. An exhaust hood and hood cover are required for this process.

An advantage of the present invention is that it creates genuine smoked food with any type of cooking grill.

Another advantage of the present invention is that it produces smoke very quickly for tasty smoked flavor even with items that cook very quickly.

An additional advantage of the present invention is that it is easy and relatively inexpensive to manufacture and extremely easy to use.

One more advantage of the present invention is that it is very durable to produce and will operate for many years producing flavorful smoked cooking.

Yet another advantage of the present invention is that if the rapid smoker is positioned under the food it prevents flare-ups from the heating source onto the food, since it covers the heating source.

Another advantage of the design and operation of the present invention is the rapid smoker may be positioned under the food so that it is capable of receiving juices or spices from the food that drips onto the rapid smoker or are placed on it, and is capable of evaporating the juices or spices into flavoring the food further.

Still another advantage of the present invention is that it creates two cooking zones in the grill, one with the invention covering the heating source producing smoke and the other zone away from the invention, food can then be moved back and forth from one zone to another being seared and smoked this process makes the meat more flavorful and also more tender.

BRIEF DESCRIPTION OF THE DRAWINGS

These and other details of my invention will be described in connection with the accompanying drawings, which are furnished only by way of illustration and not in limitation of the invention, and in which drawings.

BEST MODE FOR CARRYING OUT THE INVENTION

Figure 1:
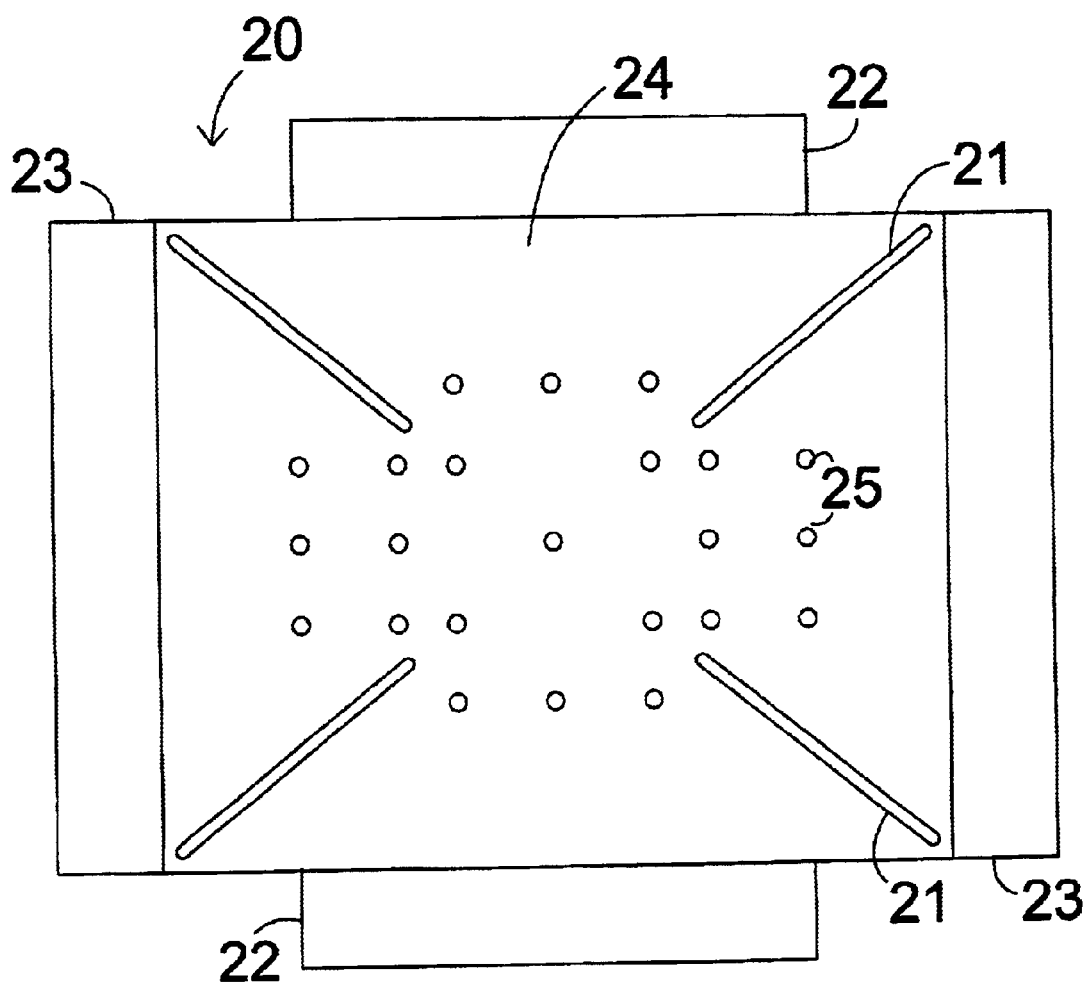
FIG. 1 is a plan view of the blank used to create the top of the rapid smoker.

In FIGS. 1–10 a rapid smoker adaptable for use in any type of grill for smoking food comprises a top plate 20 and a bottom plate 30, 30A, and 30B interconnected by placing the top plate 20 on the bottom plate 30, 30A, and 30B with the shorter tabs 22 of the top plate inserted through the space 39 between the handle 36 and the bottom plate 30.

Figure 6:
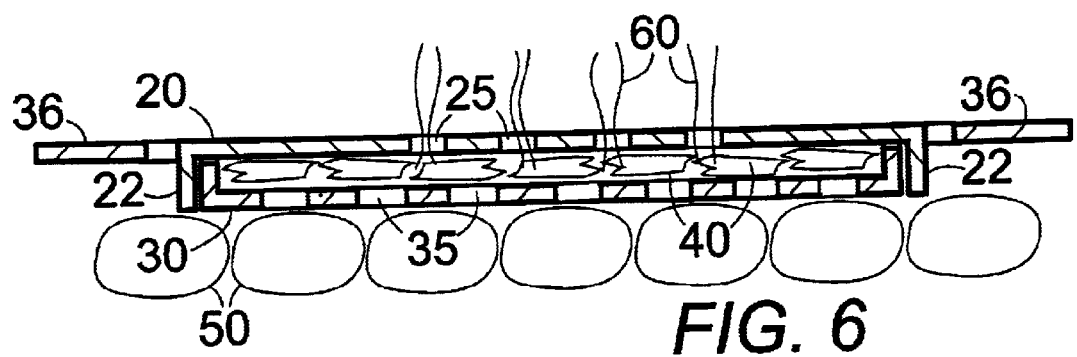
FIG. 6 is a cross-sectional view taken through section 6—6 of FIG. 5 showing the rapid smoker in action over a heating source, such as a charcoal grill or lava rocked gas grill.

The top plate 20 has a flat rectangular surface 24 with a series of top perforations 25 therethrough and side portions 22 and 23 projecting downwardly from the flat surface, the top perforations 25 capable of emitting smoke therethrough, as seen in FIG. 6.

In FIGS. 1, 2, 3, and 4 diagonal structural reinforcements such as ribs 21 on the top plate 20 and ribs which also serve as feet 31 on the bottom plate 30, which structural reinforcements may be welds or formed indents which may be added to the top and or bottom plate to prevent buckling under high heat.

The bottom plate 30 in FIGS. 2, 4, 6, 7, 8, 9 and 10 has a flat surface 34 with a series of bottom perforations 35 therethrough having more open exposure than the top perforations 25 of the top plate to allow direct contact of the wood chips 40 with the heat source and admit more air in through the bottom, the bottom plate having mating side portions 32 and 33 projecting upwardly from the flat surface, the bottom perforations being capable of admitting heat therethrough to cause combustion of a variety of smoke producing material placed in the rapid smoker, as seen in FIG. 6.

Figure 8:
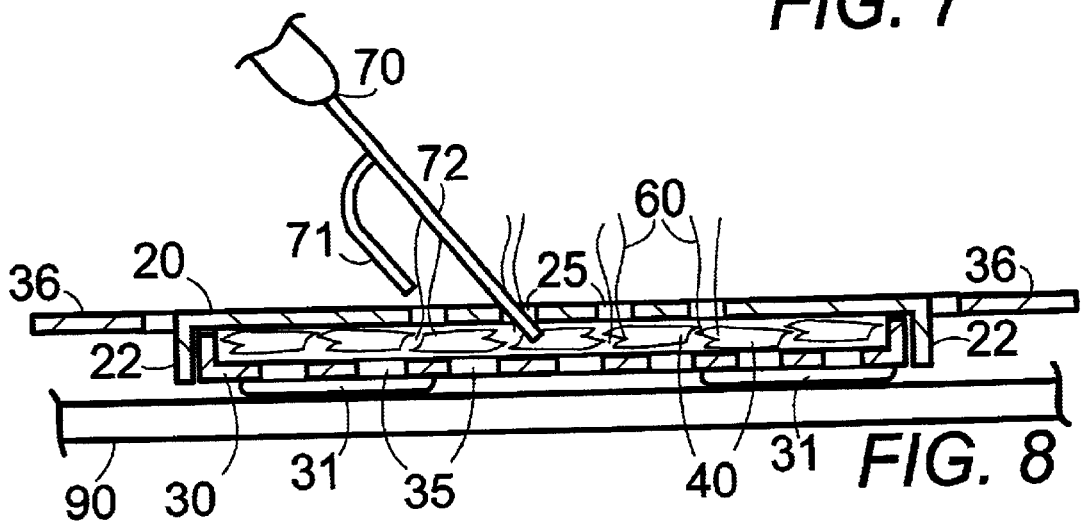
FIG. 8 is a cross-sectional view taken through section 6—6 of FIG. 5 showing the rapid smoker in action over a lower grate or heat exchanger, deflector or defuser.

The bottom plate 30 (FIG. 4) may have downwardly projecting diagonally positioned indentations 31 extending from the bottom plate to stiffen the plate to prevent buckling under high heat and to act as little feet to elevate the rapid smoker above flat heating surfaces as in FIG. 8. In FIGS. 2A and 2B the bottom plate 30A has a regular pattern of undulations forming ridges 160 and troughs 161 across the width of the plate to stiffen the plate and also act as feet to elevate the plate.

There may be larger bottom openings 35 (FIG. 4) than top openings 25 (FIG. 3) or a larger number of bottom openings 35 than top openings 25 of the same size to have more air coming into the bottom than leaving the top for control of smoke and rate of combustion to make more smoke and make the smoke begin rapidly. The perforation configurations in the two plates may be formed so that the bottom perforations 35 and top perforations 25 may be out of line with each other when the two plates are put together, as seen in FIG. 6, for the same reason of creating a better air flow for control of smoke production and rate of combustion. The convection effect of heat raising through the larger and/or number of holes in the bottom produces a rapid start of ignition (as described above) and the effect of the holes being off-set or not-aligned, increases the production of smoke and as well as controlling the combustion process.

The mating side portions overlap, top side portions 22 (FIG. 6) overlapping bottom side portions 32 and top side portions 23 overlapping bottom side portions 33 to form enclosed sides of the rapid smoker with the top and bottom plates spaced apart sufficiently to admit a layer or multi layer of smoke producing material, such as a single layer of wood chips 40 therebetween, as seen in FIG. 6, for rapid ignition and smoking of the smoke producing material.

Figure 4:
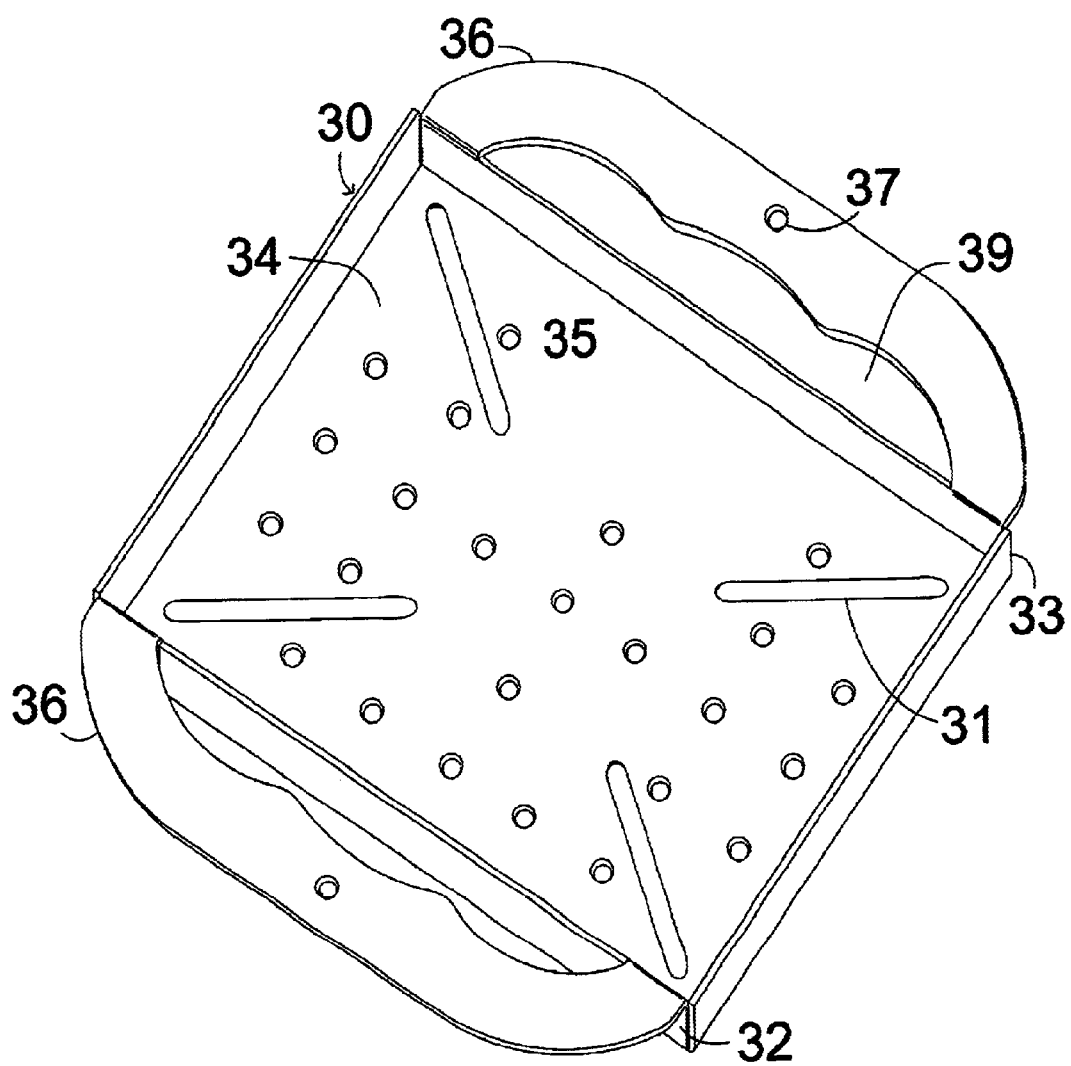
FIG. 4 is a perspective view of the bottom of the rapid smoker formed for use.
Figure 5:
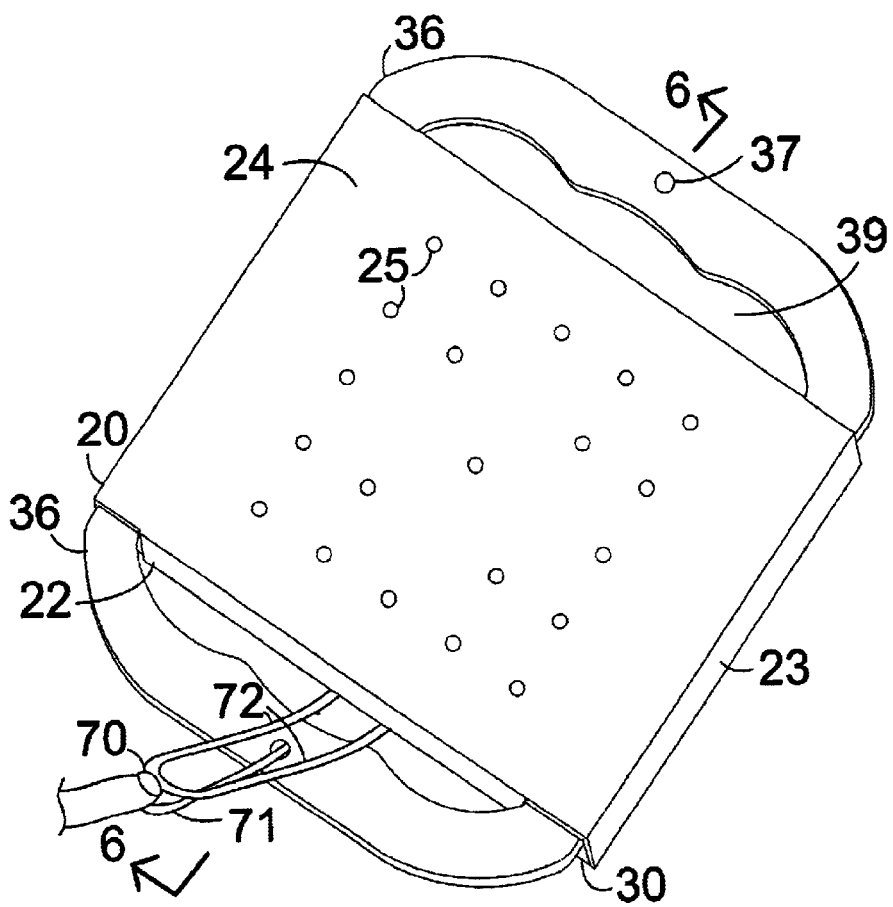
FIG. 5 is a perspective view of the rapid smoker assembled for use.

The side portions 22 and 23 (FIG. 1) of the top plate 20 and the side portions 32 and 33 of the bottom plate 30 (FIG. 2) are formed as tabs extending outwardly from the rectangular shape of each plate. The tabs capable of being bent orthogonally to form the side portions (as seen in FIG. 4) of the rapid smoker. The side portions are sized such that when the plates are interconnected the distance between the plates 20 and 30 is sufficient to accommodate different sizes of wood chips in single and multi layers. As seen in FIG. 5, the top plate 20 is slotted such that the tabs 22 are configured to fit within the space 39 between the handle 36 and the plates so that the tabs 20 are trapped by the handle 36 and the top plate 20 can raise and remain trapped by the handle 36 for the purpose of burning material of different sizes and different layers if necessary.

Figure 7:
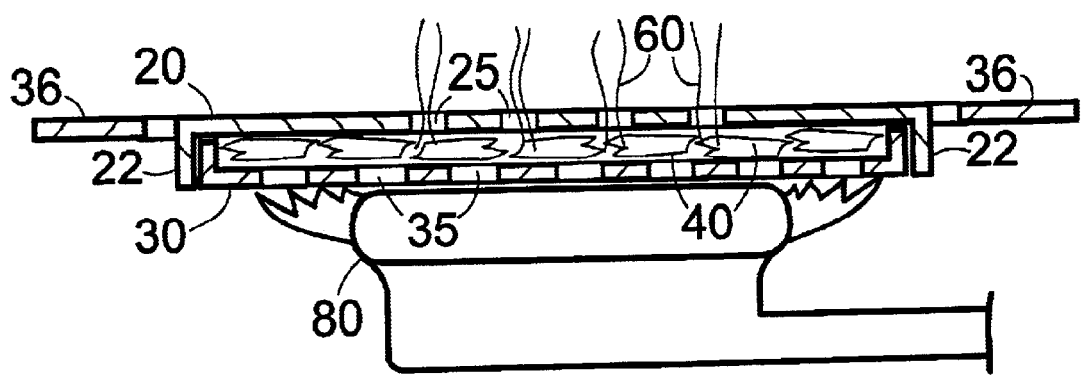
FIG. 7 is a cross-sectional view taken through section 6—6 of FIG. 5 showing the rapid smoker in action over a gas burner.
Figure 9:
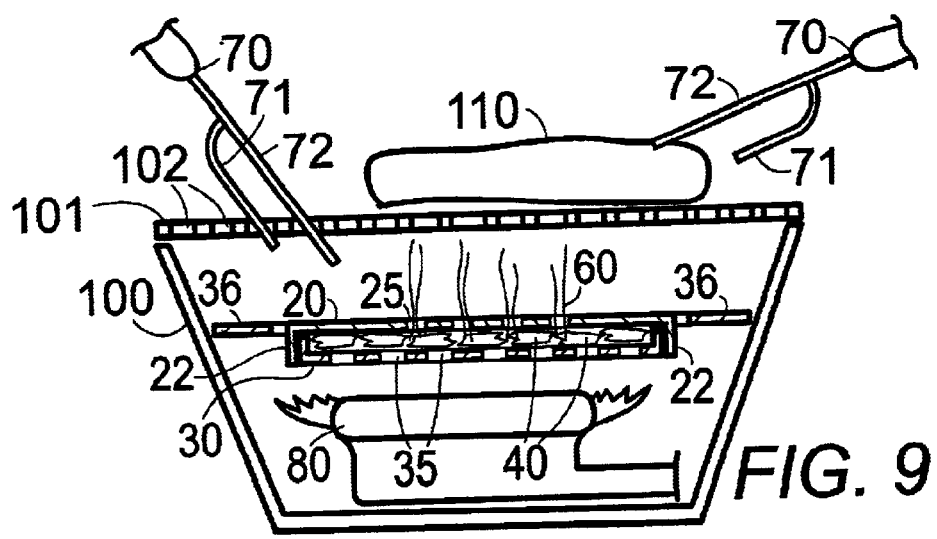
FIG. 9 is a cross-sectional view taken through section 6—6 of FIG. 5 showing the rapid smoker in action with the handles of the rapid smoker resting on the side walls of a medium or small grill.
Figure 10:
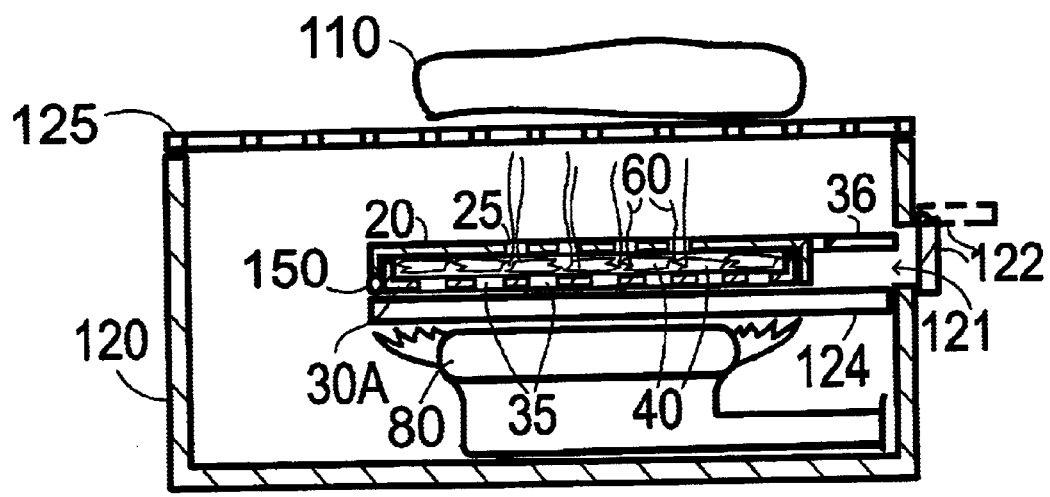
FIG. 10 is a cross-sectional view taken through section 6—6 of FIG. 5 showing the rapid smoker in action with an alternate embodiment of the rapid smoker having only one handle and a hinged opposite side which slides into a narrow opening in the wall of a large outdoor cooker or commercial indoor charcoal broiler grill and rests on tracks above the fire source, shown as a gas burner.

The rapid smoker is placed directly on a heat source of any type of a grill, such as heat elements 50 of FIG. 6 which could be charcoal briquettes or heated lava rocks or other heating means to create smoke 60 for smoking food positioned above the rapid smoker (FIGS. 9,10). In FIG. 7 the rapid smoker is positioned directly on top of a gas burner 80. In FIG. 8 the rapid smoker is positioned on a lower grate or heat exchanger deflector or defuser 90 with the downwardly projecting indentations 31 elevating the rapid smoker slightly above the surface. In FIG. 9 the rapid smoker is shown in action with the handles 36 of the rapid smoker resting on the side walls of a small grill or gas burner 100 below the cooking grate 101. In FIG. 10 an alternate embodiment of the rapid smoker has only one handle 36 and a hinged 150 opposite side which slides into a narrow opening 121 in the wall of a outdoor cooker or grill 120 or commercial indoor charcoal broiler grill and rests on tracks 124 above the fire source, shown as a gas burner 80. A hinged flap 122 acts as a door to keep the opening 121 closed.

The bottom plate 30 (FIG. 2) has a pair of handles 36 extending outwardly from the rapid smoker, the handles being formed by bending up the side portions 32 perpendicular to the flat rectangular surface 34 and then bending the handles 36 outwardly away from the bottom plate 30 with the handles 36 perpendicular to the side portions 32 and parallel to the flat surface 34 of the bottom plate 30.

The handles 36 (FIG. 5) bow outwardly from the rapid smoker creating a gripping space 39 between each of the handles and the rapid smoker and the handles extend a distance sufficient to create an extended support base for the plates and an extended area of heat radiation.

The handles 36 are each provided with a handle opening 37 through the handle and further comprising a tool 70 having prongs 71 and 72 capable of securing each of the handles through the gripping space 39 and through the handle openings 37 for placing the rapid smoker in the hot grill and removing it therefrom as seen in FIG. 5.

Figure 11:
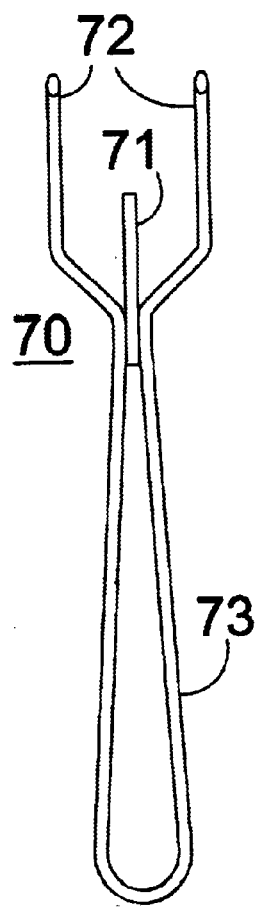
FIG. 11 is a plan view of the tool having an enlarged double fork and an added third prong spaced apart between the two fork points, the tool being used to install and uninstall the rapid smoker and also to lift the top of the rapid smoker for adding wood chips and for lifting the grill portion of an outdoor grill for installing the rapid cooker, as well as the normal function of moving the food.
Figure 12:
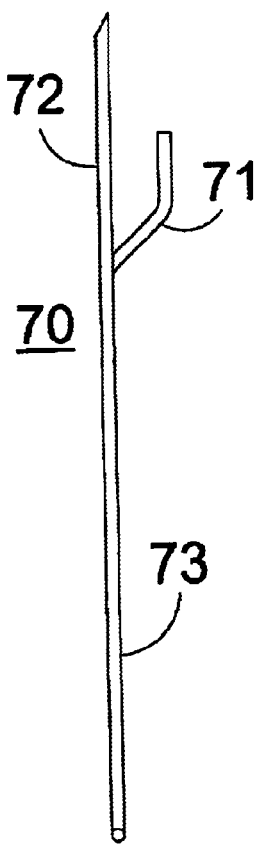
FIG. 12 is a side view of the tool of FIG. 11.

The preferred embodiment of the tool 70 having prongs comprises a two-pronged 72 cooking fork with a third prong 71 attached apart from the two prongs centrally oriented relative to the two prongs, as seen in FIGS. 11 and 12. This embodiment of the tool is in fact a four in one tool that also is used to remove the grill grate, as in FIG. 9, install the smoker as in FIG. 5, remove the smoker top as in FIG. 8 for the purpose of re-filling the rapid smoker with wood chips 40 and the tool can be use to move and/or flip your steak 110 from one temperature zone to another as in FIG. 9.

Figure 2:
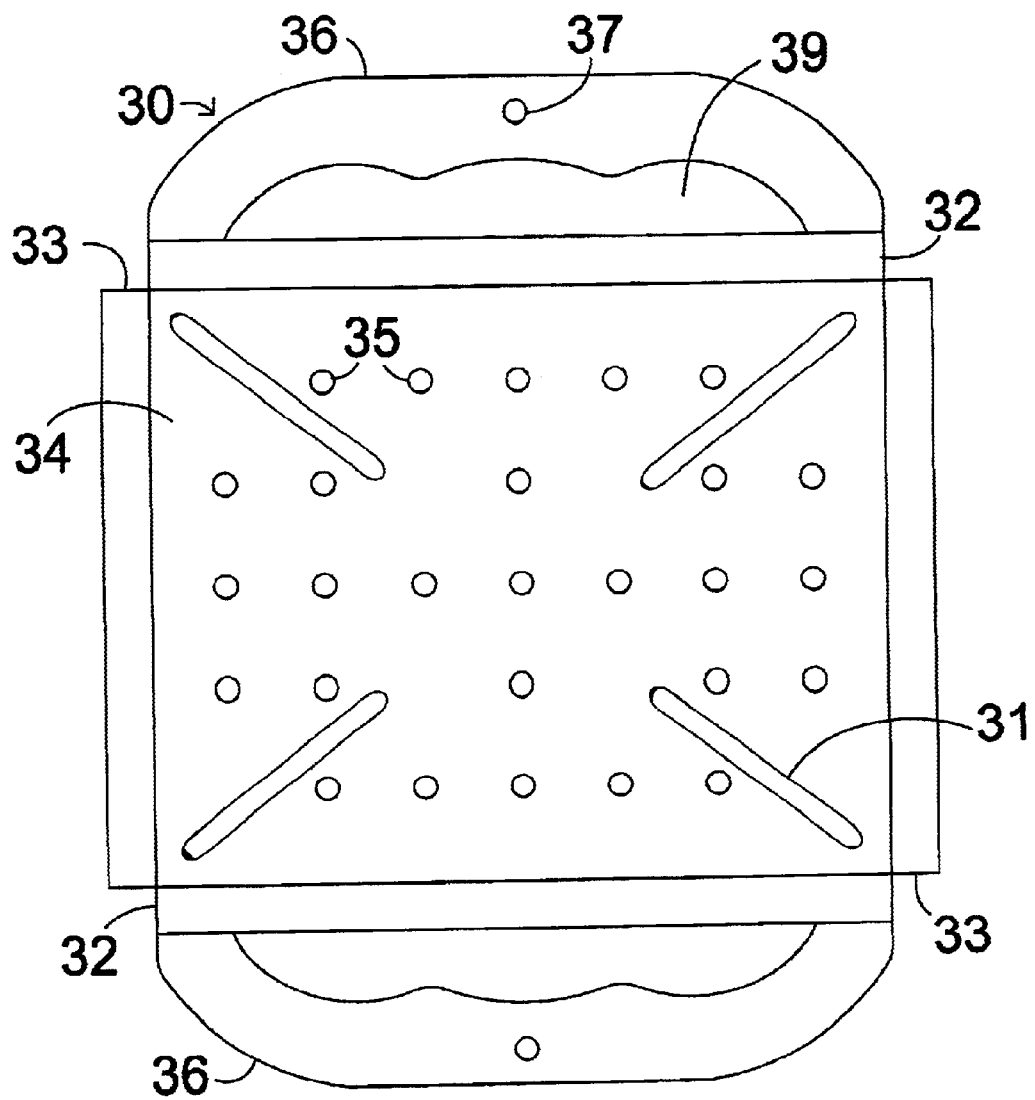
FIG. 2 is a plan view of the blank used to create the bottom of the rapid smoker.
Figure 2A:
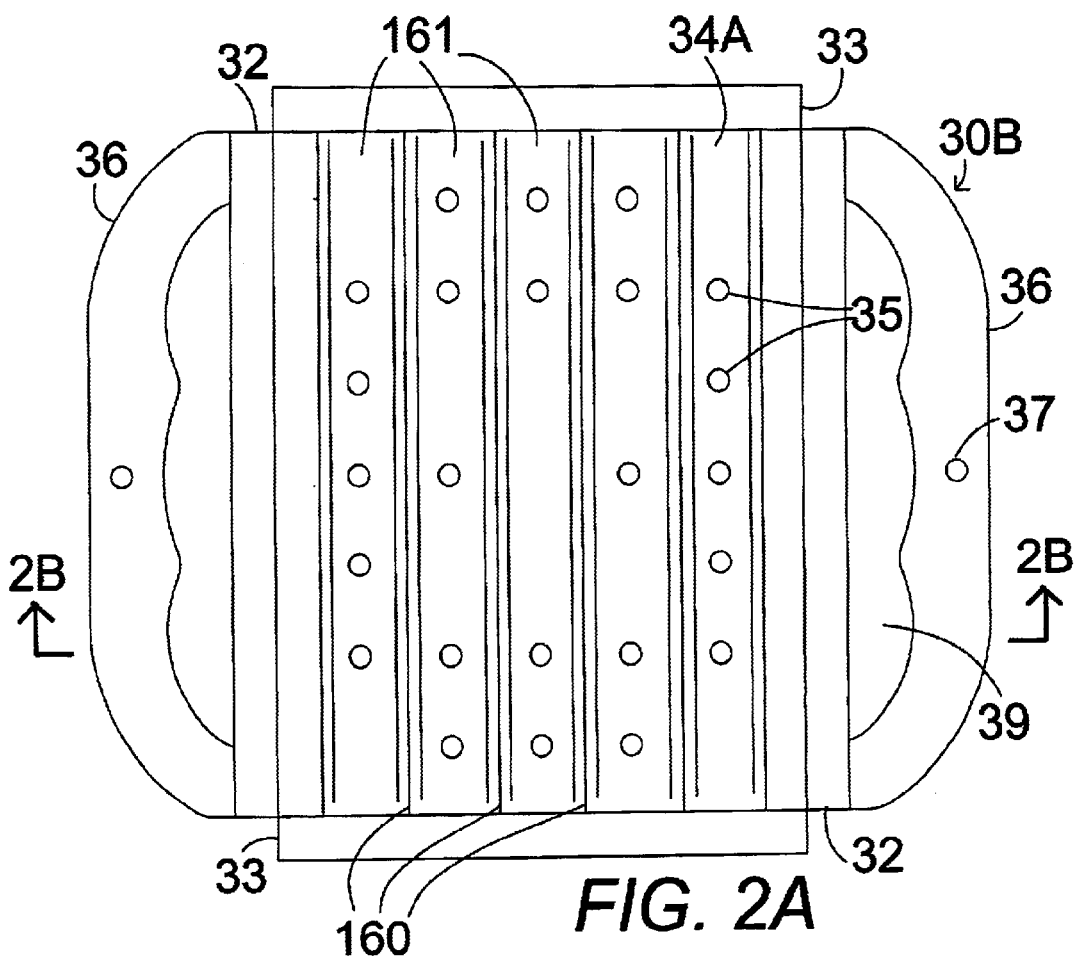
FIG. 2A is a plan view of an alternate blank used to create the bottom of the rapid smoker having undulations in the form of ridges and troughs to strengthen the plate to prevent buckling and also to serve as a means for slightly elevating the plate.
Figure 2B:
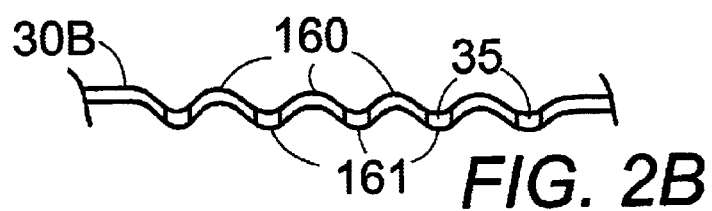
FIG. 2B is a cross-sectional view of the alternate blank for the bottom plate taken through 2B—2B of FIG. 2A.
Figure 3:
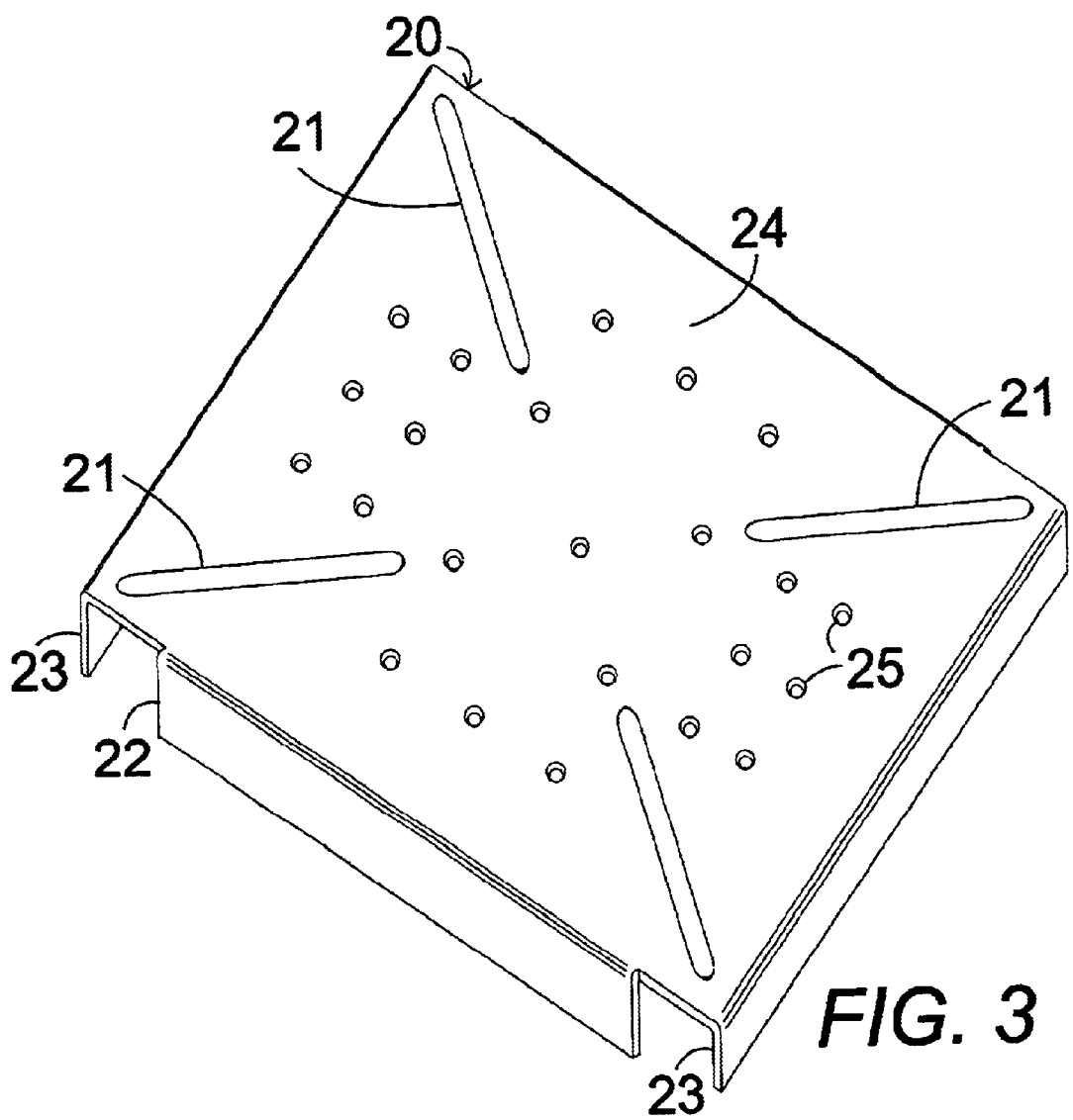
FIG. 3 is a perspective view of the top of the rapid smoker formed for use.

In FIGS. 1 and 2, the top plate 20 and the bottom plate 30 are each formed from a single sheet of metal in a rectangular shape 24 and 34, respectively, with the side portions 22 and 23 of the top plate 20 and the side portions 32 and 33 of the bottom plate 30 formed as tabs extending outwardly from the rectangular shape 24 and 34, the tabs capable of being bent orthogonally to form the side portions, as seen in FIG. 3 and FIG. 4.

The material for fabricating the top and bottom sheets is preferably high temperature stainless steel and the tabs are formed of material $1/16$–$3/8$ of an inch thick (preferably $1/16$ to $1/8$ inch). The handle being part of the bent tabs are also a functional rest on medium and small barbecue grills. FIG. 9. The plates are dimensioned to cover anywhere from $1/3$ to $2/3$ of the surface area (preferably approximately $1/2$) of the heat source of the grill. The plates are dimensioned to cover a portion of the heat source of the grill, creating two cooking zones, one hotter and the other cooler with the smoking capability.

A method of making a rapid smoker adaptable for use in any type of grill for smoking food comprises (FIGS. 1–6) forming a top plate 20 having a flat surface 24 with a series of top perforations 25 therethrough and side portions 22 and 23 projecting downwardly from the flat surface, the top perforations 25 capable of emitting smoke 60 (FIG. 6) therethrough and a bottom plate (FIG. 4) 30 having a flat surface 34 or ribbed feet 31 or an undulating surface (FIGS. 2A and 2B) with a series of bottom perforations 35 therethrough having more open exposure than the top perforations of the top plate, the bottom plate having mating side portions 32 and 33 projecting upwardly from the flat surface, the bottom perforations being capable of admitting heat therethrough to cause combustion of a variety of smoke producing materials placed in the rapid smoker, wherein the mating side portions overlap to form enclosed sides of the rapid smoker with the top and bottom plates 20 and 30 spaced apart sufficiently to admit a layer of smoke producing material 40 (FIG. 6) therebetween for rapid ignition and smoking of the smoke producing material, by using the step of forming the top plate and the bottom plate each from a single sheet of metal in a rectangular shape with the side portions formed as tabs extending outwardly from the rectangular shape, and bending the tabs orthogonally to form the side portions, the rapid smoker capable of being placed directly on a heat source of any type of a grill to create smoke 60 for smoking food positioned above the rapid smoker.

In use, a method of smoking food using a rapid smoker adaptable for use in any type of grill for smoking food comprises the step of placing a shallow layer of smoke producing material, preferably wood chips 40 from 0.5 of and inch to 1.25 inches (in FIG. 6) in a rapid smoker comprising a top plate 20 (FIG. 3) having a flat surface 24 with a series of top perforations 25 therethrough and side portions 22 and 23 projecting downwardly from the flat surface, the top perforation (FIG.4) 30 having a flat surface 34 or protruding ribs 31 with a series of bottom perforations 35 therethrough having more open exposure than the top perforations of the top plate, the bottom plate having mating side portions 32 and 33 projecting upwardly from the flat surface, the bottom perforations being capable of admitting heat therethrough to cause combustion of a variety of smoke producing materials placed in the rapid smoker, wherein the mating side portions overlap to form enclosed sides of the rapid smoker with the top and bottom plates spaced apart sufficiently to admit a layer of smoke producing material therebetween for rapid start of ignition and control of smoking of the smoke producing material, the step of placing a layer of smoke producing material in the rapid smoker, and the step of placing the rapid smoker directly on a heat source (such as the heating elements 50, 80 and 90 of FIGS. 6, 7, 8) of any type of a grill to create smoke for smoking food positioned on a grate above the rapid smoker or along side.

By placing the rapid smoker over a portion of the heat source of the grill, two cooking zones are created on a cooking grate, with one zone being cooler over the smoker by 100–150° F. and the other being hot enough for the food to be seared on the other hotter side by moving and flipping the food over the grill area that is not covered by the smoker and then over the area of the grill that is covered by the smoker allowing the food to be seared on a hot side and cooked more slowly on the cooler side over the smoker to make the food more flavorful and also more tender, in the case of meat.

The bottom plate (FIG.4) further comprises a pair of handles 36 extending outwardly from the rapid smoker, and the handles bow outwardly from the rapid smoker creating a gripping space 39 between each of the handles and the rapid smoker and the handles extend a distance sufficient to create an extended support base for the plates FIG. 9 and an extended area of heat radiation and the handles are each provided with a handle opening 39 through the handle and further comprising a tool 70 having prongs 71 and 72 capable of securing each of the handles through the gripping space and through the handle opening and further comprising the step of placing the rapid smoker in the hot grill using the tool as in FIG. 5, and the method further comprises the step of removing the grate (FIG.9) the top cover (FIG. 8) as to re-fill and to install and remove the smoker from the grill using the tool.

The tool having prongs preferably comprises a two-pronged 72 cooking fork 70 with a third prong 71 attached apart from the two prongs centrally oriented relative to the two prongs, as seen in FIGS. 11 and 12.

In the event that there is a need for more cooking or grilling time with the smoker, the grate 101 can be removed and the top cover 20 of the smoker can be removed by using the removing tool 70 by inserting the two forward fingers of the tool into two of the holes of the grill 101 or the top cover 20, as shown in FIGS. 8 and 9. A large number of grills have two grates and removal of only one is necessary.

The removing and installing tool 70 (see FIGS. 11 and 12) is a four in one tool. It will remove the grill grate (FIG. 9). It will install the smoker using the handles 36 with two prongs 72 through the space 39 between the handle 36 and the side plate 22 and the third prong 71 through the hole 37 in the handle 36 (FIG. 5). It will remove the top cover 20 of the smoker to fill up the smoker with wood chips.40 (FIG. 8) It can be used to as a fork to turn your steaks 110 (FIG. 9).

In FIG. 10 the present a modified embodiment of the smoker having a bottom 30A with a hinge 150 at one end and handle 36 at the other may slide into an outdoor grill or indoor commercial grill that has been modified with a 2 inch slot 121 (approximately) that has a hinged flap 122 in the front wall of the grill. This will also work for commercial application such as a restaurant gas fired char-broiler or gas or electric broiler. An exhaust hood and hood cover are required for the process.

It is understood that the preceding description is given merely by way of illustration and not in limitation of the invention and that various modifications may be made thereto without departing from the spirit of the invention as claimed.

What is claimed is:

1. A rapid smoker adaptable for use in any type of grill for smoking food, the smoker comprising:
    a top plate having a flat surface with a series of top perforations therethrough and side portions projecting downwardly from the flat surface, the top perforations capable of emitting smoke therethrough;
    a bottom plate having a flat surface with a series of bottom perforations therethrough having more open exposure than the top perforations of the top plate, the bottom plate having mating side portions projecting upwardly from the flat surface, the bottom perforations being capable of admitting heat therethrough to cause rapid combustion of a variety of smoke producing material placed in the rapid smoker;
    wherein the perforations in the bottom perform a function of rapid ignition of wood and smoke and the perforations in the bottom and top are configured such that control of the burning and smoking process is accomplished;
    wherein the mating side portions overlap to form enclosed sides of the rapid smoker with the top and bottom plates spaced apart sufficiently to admit a layer of smoke producing material therebetween for rapid ignition and controlled smoking of the smoke producing material;
    the rapid smoker capable of being placed directly on a heat source of any type of a grill to create smoke for smoking food positioned inside the grill and on the grate.

2. The rapid smoker of claim 1 wherein the bottom plate further comprises a pair of handles extending outwardly from the rapid smoker, wherein the pair of handles also support the smoker in medium and small grill shells above the heat source.

3. The rapid smoker of claim 2 wherein the handles bow outwardly from the rapid smoker creating a gripping space between each of the handles and the rapid smoker and the handles extend a distance sufficient to create an extended support base for the plates and an extended area of heat radiation, and the handles are each provided with a handle opening through the handle and further comprising a tool having prongs capable of securing each of the handles through the gripping space and through the handle opening for placing the rapid smoker in the hot grill and removing it therefrom.

4. The rapid smoker of claim 3 wherein the tool comprises a two-pronged cooking fork with a third prong attached apart from the two prongs centrally oriented relative to the two prongs, the tool being capable of installing and uninstalling the rapid smoker, removing a grate from a grill, and removing the top cover from the rapid smoker to re-fill the rapid smoker.

5. The rapid smoker of claim 1 wherein the top plate and the bottom plate are each formed from a single sheet of metal in a rectangular shape with the side portions formed as tabs extending outwardly from the rectangular shape, the tabs capable of being bent orthogonally to form the side portions; wherein the side portions are configured such that when the plates are interconnected the distance between the plates is sufficient to accommodate different sizes of wood chips in single and multi layers; wherein the top plate is slotted such that it is trapped by the handle and the top plate can raise and remain trapped by the handle for the purpose of burning material of different sizes and numbers of layers.

6. The rapid smoker of claim 5 wherein the plates are dimensioned to cover a portion of the heat source of the grill.

7. The rapid smoker of claim 1 wherein the perforations in the bottom plate are larger in size than the perforations of the top plate, wherein the perforations in the bottom perform a function of rapid ignition of wood and smoke and the perforations in the bottom and top are configured such that control of the burning and smoking process is accomplished.

8. The rapid smoker of claim 1 wherein the perforations in the bottom plate are greater in number than the perforations of the top plate, wherein the perforations in the bottom perform a function of rapid ignition of wood and smoke and the perforations in the bottom and top are configured such that control of the burning and smoking process is accomplished.

9. The rapid smoker of claim 1 wherein the perforations in the bottom plate are spatially offset from the perforations of the bottom plate.

10. A method of smoking food using a rapid smoker adaptable for use in any type of grill for smoking food, the smoker comprising:
    the step of placing a shallow layer of smoke producing material in a rapid smoker comprising a top plate having a flat surface with a series of top perforations therethrough and side portions projecting downwardly from the flat surface, the top perforations capable of emitting smoke therethrough and a bottom plate having a flat surface with a series of bottom perforations therethrough having more open exposure than the top perforations of the top plate, the bottom plate having mating side portions projecting upwardly from the flat surface, the bottom perforations being capable of admitting heat therethrough to cause rapid ignition and combustion of a variety of smoke producing material placed in the rapid smoker; wherein the mating side portions overlap to form enclosed sides of the rapid smoker with the top and bottom plates spaced apart sufficiently to admit a layer of smoke producing material therebetween for controlled ignition and smoking of the smoke producing material;
    the step of placing a layer and multi-layer of smoke producing material in the rapid smoker;
    the step of placing the rapid smoker directly on a heat source of any type of a grill to create smoke for smoking food positioned in the grill.

11. The method of smoking food using a rapid smoker of claim 10 wherein the bottom plate further comprises a pair of handles extending outwardly from the rapid smoker, and the handles bow outwardly from the rapid smoker creating a gripping space between each of the handles and the rapid smoker and the handles extend a distance sufficient to create an extended support base for the plates and an extended area of heat radiation and the handles are each provided with a handle opening through the handle and further comprising a tool having prongs capable of securing each of the handles through the gripping space and through the handle opening and further comprising the step of placing the rapid smoker in the hot grill using the tool.

12. The method of smoking food using a rapid smoker of claim 11 wherein the tool having prongs comprises a two-pronged cooking fork with a third prong attached apart from the two prongs centrally oriented relative to the two prongs and further comprising the step of using the tool to raise and lower a grate for installing and accessing the rapid smoker and to raise and lower the top plate for installing more smoke producing material therein and to manipulate the food on the grate.

13. The method of smoking and cooking food using a rapid smoker of claim 10 wherein the plates are configured to cover a portion of the heat source and further comprising the step of placing the rapid smoker over a portion of the heat source of the grill creating two cooking zones on a cooking grate, with one zone being cooler over the smoker and the other being hot enough for the food to be seared on the other hotter side, by moving and flipping the food over the grill area that is not covered by the smoker and then over the area of the grill that is covered by the smoker allowing the food to be processed searing it on a hot side and cooking it more slowly on the cooler side over the smoker making the food more flavorful and also more tender.

14. A method of making a rapid smoker adaptable for use in any type of grill for smoking food, the method comprising:

forming a top plate having a flat surface with a series of top perforations therethrough and side portions projecting downwardly from the flat surface, the top perforations capable of emitting smoke therethrough and a bottom plate having a flat surface with a series of bottom perforations therethrough having more open exposure than the top perforations of the top plate, the bottom plate having mating side portions projecting upwardly from the flat surface, the bottom perforations being capable of admitting heat therethrough to cause rapid ignition for combustion of a variety of smoke producing material placed in the rapid smoker, wherein the mating side portions overlap to form enclosed sides of the rapid smoker with the top and bottom plates spaced apart sufficiently to admit a layer of smoke producing material therebetween for rapid ignition and smoking of the smoke producing material, by using the step of forming the top plate and the bottom plate each from a single sheet of metal in a rectangular shape with the side portions formed as tabs extending outwardly from the rectangular shape, and bending the tabs orthogonally to form the side portions, the rapid smoker capable of being placed directly on a heat source of any type of a grill to create smoke for smoking food positioned inside the grill and on the grate.

15. The method of making a rapid smoker of claim 14 wherein the side portions of the rapid smoker are configured such that when the plates are interconnected the distance between the plates is sufficient to accommodate different sizes of wood chips in single and multi layers;

wherein the top plate is slotted such that it is trapped by the handle and the top plate can raise and remain trapped by the handle for the purpose of burning material of different sizes and numbers of layers.

16. The method of making a rapid smoker of claim 14 wherein the plates are dimensioned to cover a portion of the heat source of the grill creating two cooking zone on the cooking grate, with one zone over the rapid smoker 100–150 degrees F. cooler than the other.

17. The method of making a rapid smoker of claim 14 wherein the perforations in the bottom plate are greater in total area than the perforations of the top plate, wherein the perforations in the bottom perform a function of rapid ignition of wood and smoke and the perforations in the bottom and top are configured such that control of the burning and smoking process is accomplished.

18. The method of making a rapid smoker of claim 14 wherein the perforations in the bottom plate are spatially offset from the perforations of the bottom plate, wherein the perforations in the bottom perform a function of rapid ignition of wood and smoke and the perforations in the bottom and top are configured such that control of the burning and smoking process is accomplished.

19. The method of making a rapid smoker of claim 14 wherein the rapid smoker is capable of covering a portion of the heat source to keep the heat source fire from flaming up on the food.

20. The method of making a rapid smoker of claim 14 where the rapid smoker is positioned under the food and is capable of receiving juices and spices from the food that drips onto the rapid smoker and placed on it such that it is capable of evaporating the juices and spices to flavor the food further.

* * * * *